March 22, 1966  W. S. SAUNDERS  3,241,876
APPARATUS FOR REDUCING LINEAR AND LATERAL WIND RESISTANCE
IN A TRACTOR-TRAILER COMBINATION VEHICLE
Filed Jan. 31, 1964  3 Sheets-Sheet 1

INVENTOR
W. SELDEN SAUNDERS

D. Paul Weaver
ATTORNEY

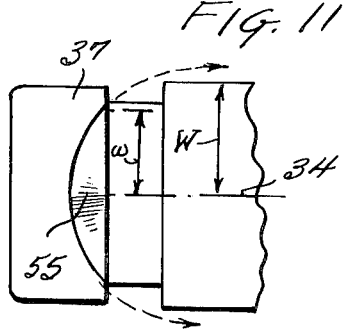
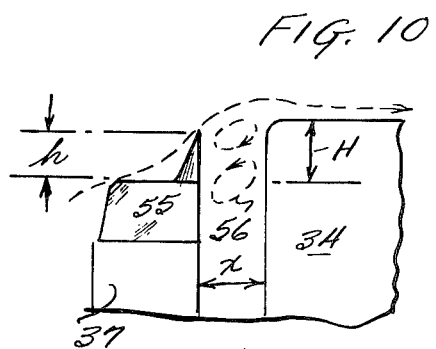
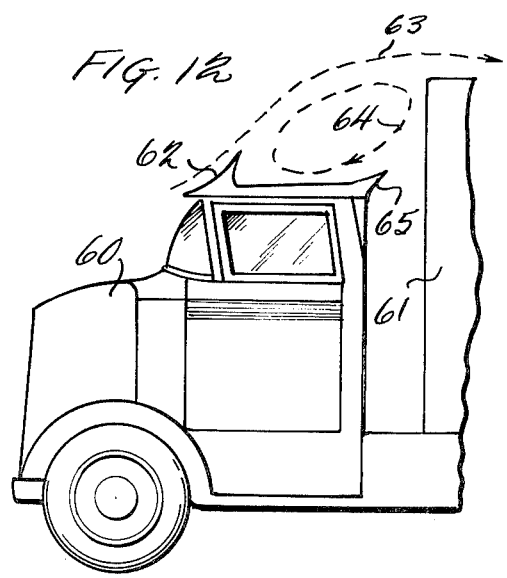
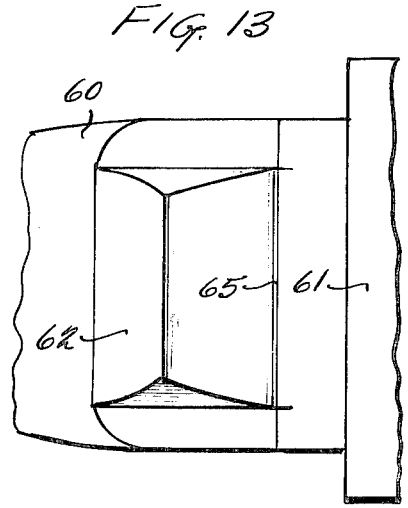
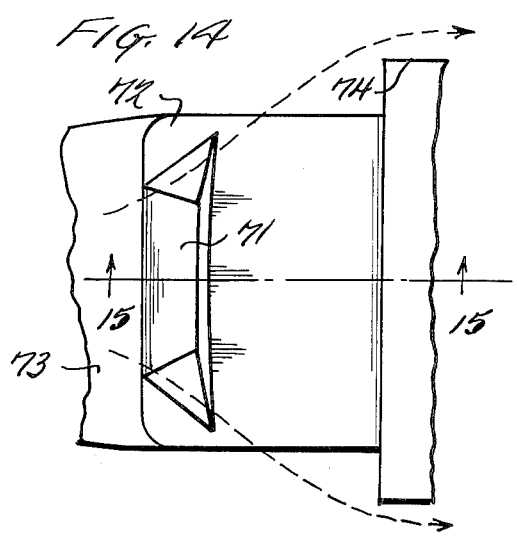
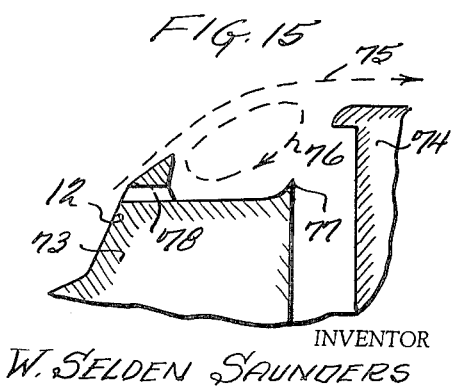

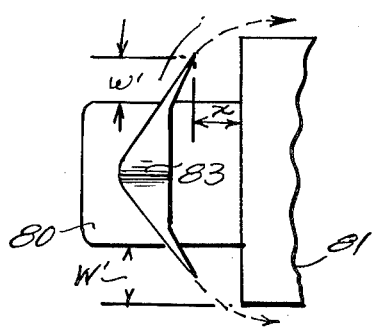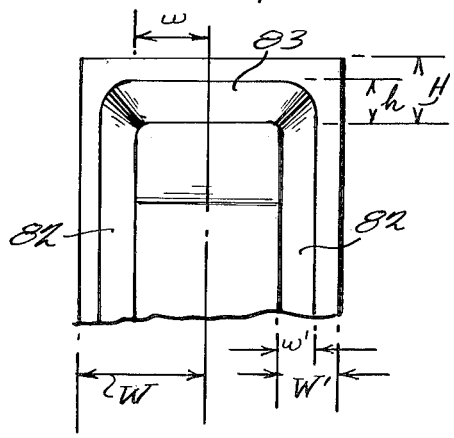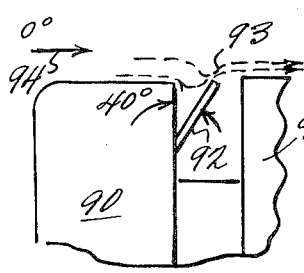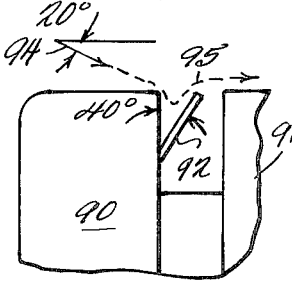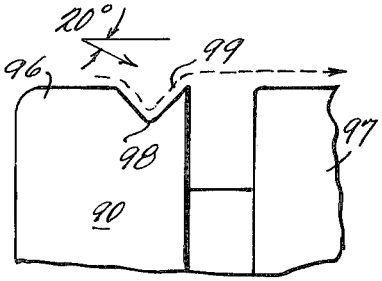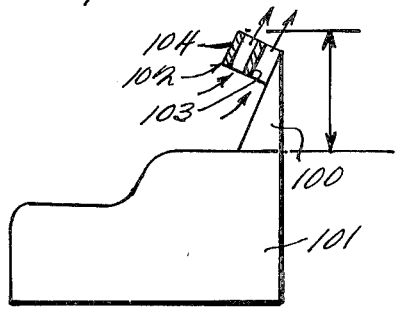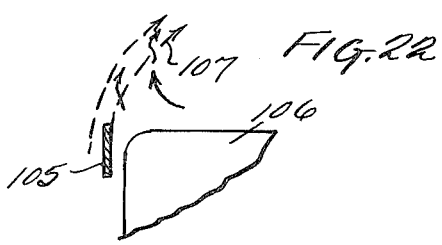

United States Patent Office 3,241,876
Patented Mar. 22, 1966

3,241,876
APPARATUS FOR REDUCING LINEAR AND LATERAL WIND RESISTANCE IN A TRACTOR-TRAILER COMBINATION VEHICLE
Walter Selden Saunders, 8014 Bradley Blvd., Bethesda, Md.
Filed Jan. 31, 1964, Ser. No. 341,622
4 Claims. (Cl. 296—1)

This invention relates to apparatus for reducing the wind resistance or drag effecting the linear movement of a tractor-trailer combination, as well as reducing the yaw or side sway occasioned by a cross wind, and constitutes a continuation-in-part of my copending application Serial No. 215,424, now abandoned, filed August 7, 1962, entitled, Device to Reduce the Air Resistance of Trucks.

A primary object of this invention is the provision of apparatus adapted to be connected or attached to a tractor or trailer in a combination vehicle which will effectively reduce the wind resistance to forward movement, or drag thereof.

A further object of the invention is the provision of apparatus of this character which will also effectively reduce the side sway or yaw of such a combination vehicle as effected by a transverse or cross wind during the forward travel of the vehicle.

An additional object of the invention is by reducing the resistance of drag and yaw to reduce fuel consumption, diminish driver fatigue, and enhance dynamic stability on the road, as well as to accelerate the speed of transit of the vehicle.

Still another object of the invention is the provision of a device of this character which will operate in a manner different from that of previous devices which contemplate similar results, in that, rather than streamlining the vehicle body, either the tractor or trailer, to afford a smooth and uniform air flow, thus creating a difficult manufacturing problem, as well as reducing the body capacity of the vehicle, the device of the instant invention produces a relatively wide diffusion of the air impacting the forward portion of the trailer, and causes the same to readhere to the body of the truck rearwardly of the front portion thereof in a relatively smooth and even manner, while at the same time creating a low pressure area or bubble between the tractor and the front of the trailer, so that the trailer will, in effect, be pushing forward against reduced rather than increased resistance.

As conducive to a clearer understanding of this invention, it may here be pointed out that applicant is aware that various methods have heretofore been proposed for reducing the drag of vehicles of this nature. Such methods have, however, followed conventional streamlining techniques, a streamlined body being generally considered to be one in which the flow experiences minimum separation from the surface of the body. Since a trailer truck is not a streamlined body, because the flow will normally separate from all of the relatively sharp edges of the truck, such conventional techniques have been uniformly unsatisfactory. The conventional streamlining techniques heretofore applied have attempted to minimize the forward separation of air by either rounding the forward corners of the truck, employing streamlining vanes or guide vanes to keep the air separation to a minimum, or enclosing the tractor-trailer gap with some form of fairing. The instant invention, which is concerned only with the drag arising from the separation occurring at the forward portions of the truck and not with drag due to separation at the rear of the trailer, differs from the above in that there is employed a deflecting device mounted on the tractor which deflects the onrushing air in such manner as to occasion a very large separation of the air flow. This deflection is made to occur, however, in such fashion that the flow moves convexly across the gap between the tractor and trailer and reattaches to the forward periphery of the trailer. This separation causes a low pressure bubble to be formed in the gap between the tractor and trailer, and although a large separated region exists, the flow pattern which is set up results in a very material drag reduction due to the lowered resistance encountered by the forward portion of the trailer. As expected, such a deflector added to a tractor alone will increase its drag, but the drag of the combination is significantly and unexpectedly reduced. It is a primary object of this invention therefore to provide an attachment which produces a material reduction in the drag of a trailer-tractor combination, and the consequent inherent benefits of such reduction, in accordance with the principles outlined above.

Still other objects reside in the combinations of elements, arrangements of parts, and features of construction, all as will be more fully pointed out hereinafter and disclosed in the accompanying drawings.

In the drawings:

FIG. 10 is a schematic side elevational view of a modified form of deflector in accordance with the construction of FIG. 1 omitting the side shields.

FIG. 11 is a top plan view of the structure of FIG. 10.

FIG. 12 is a side elevational view of a modified form of deflector shown as applied to the roof of a tractor unit omitting the side deflector plates for the control of yaw.

FIG. 13 is a top plan view of the deflector of FIG. 12.

FIG. 14 is a top plan view of a modified form of construction.

FIG. 15 is a sectional view taken substantially along the line 15—15 of FIG. 14.

FIG. 16 is a top plan view of a further modified form of deflector adapted to be employed when the tractor is narrower than the trailer and including the side deflector shields.

FIG. 17 is a schematic front elevational view of the shield and tractor cab of FIG. 16, parts thereof being broken away.

FIG. 18 is a top plan view of a portion of a tractor-trailer unit illustrating diagrammatically a completely masked shield and indicating the air flow when the relative wind is dead ahead.

FIG. 19 is a view similar to FIG. 18 but disclosing the change in air flow effected by a masked shield at large angles of yaw.

FIG. 20 is a view similar to FIG. 18 but disclosing a masked side shield constructed integrally with the tractor body.

FIG. 21 is a schematic side view of a conventional tractor cab provided with a shield in accordance with the instant invention, illustrating the employment of a series of turning vanes to augment the action of the deflector of the instant invention.

FIG. 22 is a fragmentary view showing a deflector vane associated with a box on the top of a tractor roof.

Similar reference characters refer to similar parts throughout the several views of the drawings.

Figure 1:
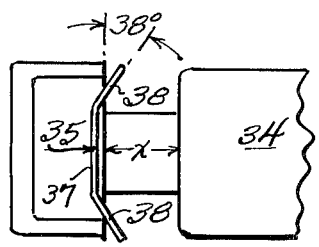
FIGURE 1 is a partially schematic and partially broken away top plan view of a tractor-trailer combination provided with a deflector or shield in accordance with a preferred embodiment of the instant invention, parts thereof being broken away.
Figure 2:
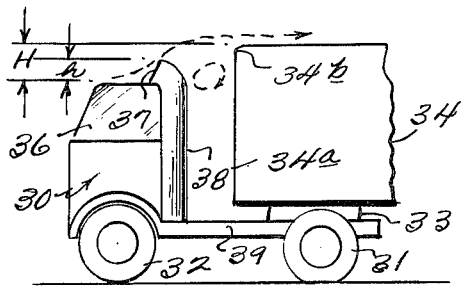
FIG. 2 is a side elevational view of the portions of the vehicle schematically shown in FIG. 1.
Figure 3:
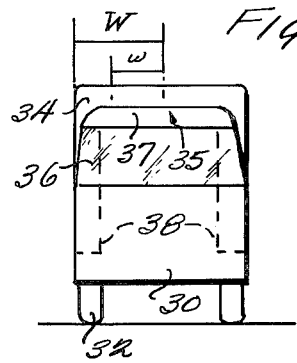
FIG. 3 is a front elevational view of the structure of FIGS. 1 and 2.
Figure 4:
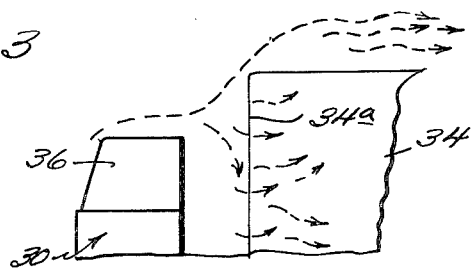
FIG. 4 is a diagrammatic fragmentary side elevational view illustrating the turbulent air flow of a conventional tractor-trailer combination vehicle without the deflector of the instant invention.

Having reference now to the drawings in detail, and more particularly to FIGS. 1, 2 and 3, there is herein shown a preferred embodiment of the inventive concept as applied to a tractor-trailer combination wherein the height of the tractor cab is substantially less than the height of the trailer, but the width is substantially the same, as frequently occurs under present-day conditions. The tractor is generally indicated at 30, and includes in addition to the usual driving and steering wheels 31 and 32, a fifth wheel assembly 33 upon which the forward end of the trailer 34 is mounted in conventional fashion. The instant invention comprises a plate or deflector generally indicated at 35 mounted on the roof of the cab 36 of the tractor, and at a predetermined distance from the normal forward end 34a of the trailer. The shield includes a central portion 37 which is inclined upwardly and rearwardly toward the front of the trailer, and a pair of rearwardly inclined opposite side portions 38, which extend the full height of the body of the tractor above its bed or frame 39. It has been determined by experimentation, as will be more fully described hereinafter, that the height of the shield 35 and its distance from the forward end of the trailer determine to a large extent the effectiveness of the shield in decreasing drag or wind resistance. As shown in FIG. 4, in a tractor-trailer combination dimensioned in accordance with that disclosed in FIGS. 1 to 3, but without the provision of a shield such as disclosed, the air flowing over the forward end of the cab is deflected to a minor extent and impinges directly on the flat front surface of the trailer. This creates a marked increase in wind resistance in the gap between the tractor and trailer and sends air, as indicated by the arrows in FIG. 4, in a highly turbulent condition about the sides and over the top of the vehicle. With a top shield constructed in accordance with the instant invention the air flow follows the course of the arrows in FIG. 2, being deflected upwardly to a distance above the sharp corner 34b at the top of the trailer and then reattaching itself smoothly to the top surface at a position beyond the abrupt juncture. This smooth air flow creates a reduction in pressure in the space between the rear of the tractor and the front of the trailer, and such air as flows into this area circulates, as indicated diagrammatically in FIG. 2, in reduced pressure eddies. In consequence the forward end of the trailer is travelling against a reduced pressure area, and a material reduction in drag is thus effectuated.

The side shields 38 offer little or no resistance to the forward passage of the tractor when travelling directly into the wind, or when the only wind pressure is occasioned by velocity, and serve to prevent the influx of air around the sides of the rear of the tractor into the gap between the tractor and trailer wherein the reduced pressure air circulates in eddies. The primary function of the side plates is, however, to preclude the entrance of air into the gap under those conditions wherein the direction of travel of the vehicle is angular to the direction of the wind. Under such wind conditions air impinging against the front of the trailer has frequently materially increased the normal yaw or side sway of the trailer to a point of danger. As will be more fully pointed out hereinafter, the provision of the angularly and rearwardly extending baffles reduces to a material extent the yaw and drag produced by a cross wind.

Figure 5:
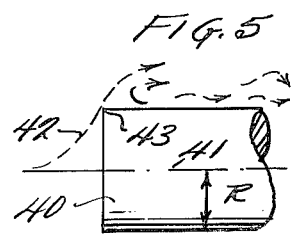
FIG. 5 is a diagrammatic view illustrating the flow pattern of air over a cylinder whose axis is parallel to the direction of the flow.
Figure 6:
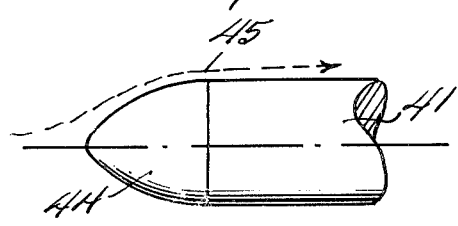
FIG. 6 is a similar view of the flow pattern which occurs when the cylinder of FIG. 5 is shielded by a typical streamlined fairing or nose cone.
Figure 7:
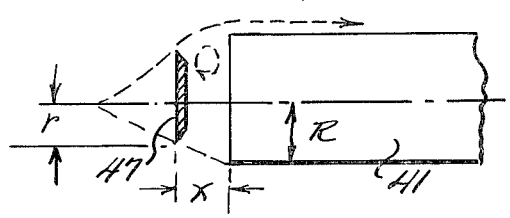
FIG. 7 is a similar view which discloses the flow pattern when the cylinder of FIG. 5 is shielded by a disk, illustrating the principles of the instant invention.
Figure 8:
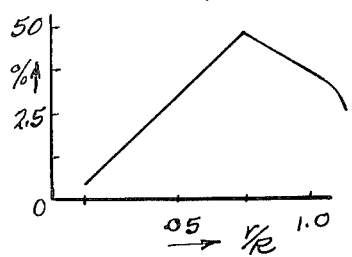
FIG. 8 is a graph disclosing the percent of drag reduction for the cylinder and disk of FIG. 7 over that of the cylinder of FIG. 5 for various ratios $r/R$, where $r$ represents the radius of the disk and R the radius of the cylinder.
Figure 9:
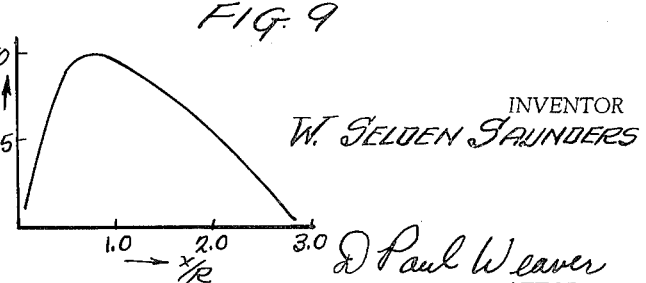
FIG. 9 is a graphic representation of the percentage of drag reduction for a cylinder and disk in accordance with FIG. 7 over the cylinder of FIG. 5 for various ratios of $x/R$ where $x$ is the distance of the shield from the end of the cylinder and R is the radius of the cylinder.

The relation of the height of the shield or baffle to the difference in height between the roof of the tractor and the roof of the trailer as well as the distance of the deflector from the front of the trailer constitute an important feature in deriving optimum results. Extensive wind tunnel tests have resulted in the derivation of an empirical formula for the proper determination of this height and width. Such tests have been conducted primarily with a cylinder, as shown in FIG. 5 at 40, in a wind tunnel. In FIG. 4 with the center line of the cylinder as shown at 41 there is disclosed an example of the drag arising from the separation of the flow from the forward portion, the separation arising as at 42, and separating at the sharp edge 43 of the cylinder face creating a turbulent wake along the sides of the cylinder and resulting in an extremely large drag. This reaction is comparable to and typical of the forward face of a trailer vehicle in motion. If a rounded nose cone 44 is added to the cylinder 41 as shown in FIG. 6 providing a conventional streamlined nose, the separation of the flow is prevented and a relatively smooth air flow as indicated at 45 is provided materially reducing the drag. FIG. 7 discloses schematically the theory of applicant's invention which constitutes the provision of a baffle, or deflector 47, in this case in the form of a disk in front of the cylinder. Disks of different radii $r$ were positioned at different distances $x$ in front of the cylinder and tested in an open jet wind tunnel. The results are disclosed in the graph of FIG. 8 wherein the percentage of drag reduction of the combination of cylinder and disk over the cylinder alone is plotted versus the ratio $r/R$ where R is the radius of the cylinder. FIG. 9 is a similar graph plotted in variations of the distance $x$ between the disk and the cylinder face in relation to R, the radius of the cylinder. By means of these tests it was discovered that a maximum drag reduction of approximately fifty percent is achieved when $r/R$ equals 0.7 and $x/R$ equals 0.7. This drag reduction is very slightly less than that measured with the nose cone of FIG. 6 and represents a substantial drag reduction. The application of the knowledge gained by such tests and the application thereof to devices for the reduction of drag in tractor-trailer combination vehicles in such cases where a conventional nose cone or fairing is not practical constitutes a primary element of the instant inventive concept. Rather than preventing the separation of the streamline by a rounded nose cone of conventional type, the addition of a large deflecting disk or shield forces a wide separation of the air approaching the cylinder but the position and angle of the streamline are fixed in such a way that the flow curves convexly over the gap between the disk and the cylinder, or, alternatively, between the tractor and the trailer, and re-attaches to the periphery of the cylinder or sides of the truck in substantially parallel relation to its sides. The interior of the gap between the two elements is at relatively low average pressure and is filled with quasi-stable eddies or bubbles as indicated in FIG. 7 and again in FIG. 2. Although these eddies exist, there is no violent interaction with the flow around the body and no violent wake is produced, and although a large region of separated flow exists, the drag remains relatively low.

The application of these principles to a deflecting device attached to a tractor as in FIG. 1 is further illustrated in FIGS. 10 and 11. Here a deflector 55 in general similar to the portion 37 of the deflector 35 is mounted on the top of a tractor which is spaced a distance $x$ from a trailer 34. The difference in height between the roof of the tractor and that of the trailer is indicated by H, while the height of the shield constructed in accordance with the previously derived shield is indicated by $h$. The arcuate deflector 55 which is inclined rearwardly forces the air out of its usual path before it reaches the gap region. The flow then curves convexly back across the gap and reattaches to the periphery of the trailer in a direction which is substantially parallel to the sides and top of the trailer. The gap is filled with quasi-stable eddies 56 as previously indicated in connection with FIG. 2, which eddies are isolated from the main flow and at relatively low pressure. The situation is substantially identical to that described in connection with FIG. 7. The baffle or deflector 55 and the air deflected thereby form a shield which precludes the relative wind from striking the front of the trailer and entering the gap between the tractor and trailer. Similarly, a region of low pressure is created in the gap and the trailer thus follows the tractor in a partial vacuum materially reducing the overall drag and rendering the unit more stable. In computing the height of the shield as used on the roof of the truck as shown in FIGS. 10 and 11 with the shield having a half width $w$ and a height $h$ and spaced as previously stated a distance $x$ from the trailer it has been found that by employing the empirical formula previously discussed, that W corresponds to R and that the curves of FIGS. 8 and 9 depict the approximate variation of the drag reduction within the parameter previously defined. Thus a maximum drag reduction is obtained when $x/W$ equals 0.7 and $w/W$ equals 0.7. Applying the formula $r/R$ to the height of the shield and substituting therefor $h/H$ a curve similar to FIG. 8 is produced so that when $h$ equals 0.7H a maximum drag reduction is achieved.

As shown in FIG. 8, effective, though not optimum results may be obtained when the height ratio of the shield or $h/H$ is between 0.5 and 0.9. Similarly, as shown in FIG. 9, a wide variance in the ratio of the distance of the shield or baffle from the front of the trailer, or $w/W$ is effective, though in progressively decreasing increments, over a range between 0.3 and about 2.0.

The frontal shape of the shield may vary, and it has been found advantageous to round the corners of the shield with a radius of about $\frac{1}{3}h$, although the rounded corners are not essential to the achievement of material drag reduction with the shield in the instant invention. FIGS. 12 and 13 disclose a modified form of shield embodying the basic inventive concept but which is more adapted to use where the relative gap between the tractor 60 and the trailer body 61 is relaitvely small. Here a shield or baffle 62 is provided on the forward edge of the roof of the trailer cab to deflect the main stream of air upwardly as at 63 and over the roof of the trailer while turning back a portion thereof to form an eddy or bubble 64 which serves further to deflect air from the front of the trailer 61, reducing the drag of the combination. A lip 65 may be provided at the rear of the cab roof which serves to assist in retaining the eddy 6 and in preventing further interchange between the outside air and the air in the gap between the rear of the tractor and the trailer.

FIGS. 14 and 15 disclose a further modification of the structure of FIGS. 12 and 13 wherein a shield 71 is provided adjacent the forward edge of the cab 72 of a tractor 73, which is provided with a trailer 74. Here the air flow 75 is similar to that shown at 63 in FIG. 12 and an eddy 76 is provided. A lip 77 corresponds to the lip 65. However, in this modification the shield is provided with a slot 78, which allows a second current of air to flow along the roof and over the lip 77, which further stabilizes the bubble 76 and precludes the entrance of air into the gap between the tractor and trailer, If a cross wind is blowing over the road the vehicle is traversing, a relative wind at an angle of yaw as great as or sometimes greater than twenty degrees may be encountered. At a large angle of yaw the shield or deflector loses a certain amount of its ability to deflect the air around the windward side of the trailer and a material quantity of wind enters the gap between the tractor and trailer to increase the drag. This may be countered to some extent by extending the top shield to its legal limit, that is where $w/W$ equal 1, but this reduces the performance when the wind is dead ahead. A consideration of FIG. 8 discloses that the peak showing the percent of drag reduction $x/R$ and therefore $x/W$ is not as sharply peaked as that for $h/H$. The center of the shield may be therefore moved forwardly on the tractor roof without seriously affecting its ability to reduce the drag at a zero angle of yaw. This change in shape, however, increases the deflection on the windward side up to a large angle of yaw and therefore an increase in $w/W$ is not necessary. The curvature of shield 55 accomplishes this to some extent. Although the shield now resembles a wrap-around windshield for a conventional vehicle, and has a pleasing appearance, its opertaion is exactly the opposite of that of a wrap-around windshield in that the curved and slanted windshield keeps the separation to a minimum while the deflecting shield 55 is shaped so as to provide a separation of the flow in accordance with the precepts of the instant invention.

The flow of air around the sides of the truck behaves in a manner similar to that over the top, obviously, and in cases where the tractor vehicle 80, as shown in FIGS. 16 and 17, is materially narrower than that of the trailer 81, a shield 82 is provided along each edge of the cab extending downwardly from a central forwardly peaked top shield 83. It has been determined that the distance $w'/W'$ equals 0.7 where $w'$ equals the extension of the shield beyond the edge of the tractor and $W'$ equals the width of extension of the trailer beyond the side of the tractor most advantageous results are provided. The side edges 82 preferably extend beyond the ends of the top shield 83 and should be merged in a smooth curve as shown in FIG. 17. Such side shields can be extended rearwardly as shown in FIG. 16 and should be located as close as possible to the trailer while still allowing a ninety degree maximum rotation of the tractor and a four inch minimum clearance space between the tractor and trailer at any angle of rotation. Preferably the side shields are slanted back to a material extent.

A material improvement in performance is effected by the structure of FIG. 1 when, if the tractor is sufficiently wide, its body may be used to mask a portion of the side shield when the wind is dead ahead. In this case a side shield may be used which is large enough to give a very material drag reduction at large angles of yaw, but which will be completely masked so that the zero yaw performance when the wind is head ahead is completely unaffected. The preferred embodiment of the invention as shown in FIG. 1 incorporates such a principles which is further schematically illustrated in FIGS. 18 and 19. Here the tractor vehicle 90 is provided in the gap between it and its associated trailer 91 with a vertically positioned deflector plate 92. The preferred angle of declination to the rear has been found by experiment to be approximately forty degrees, as illustrated also in FIG. 1. When the wind is dead ahead or the yaw angle is zero as illustrated at 94, the air flow is indicated at 93, the shield having thus virtually no effect on the drag of the vehicle. However, when a cross wind is blowing and the angle of yaw is twenty degrees or less as shown at 94 in FIG. 19, the air flow path is indicated at 95, where the air flowing sharply around the rear corner of the tractor is deflected by the shield 92 in a manner similar to that previously described, and passes smoothly along the sides of the trailer, being completely excluded from the gap therebetween.

A modification of this principle is shown in FIG. 20 which discloses schematically the top of a tractor 96 and its associated trailer 97 having a gap therebetween wherein the side of the tractor is formed with a vertical recess 98, which deflects the air path at 99 away from the gap between the tractor and trailer in substantially the same manner as the shield 92 previously described.

Such side shields and/or masked side shields may be also advantageously employed between two trailers which are connected in a train, or in any surface in which there exists a gap. Preferably the masked side shields merge smoothly with the roof shield as shown in the embodiment of FIGS. 1, 2 and 3.

Under certain circumstances where, for example, it is necessary to keep the deflector height as low as possible, a deflector with an actual height $h$ less than 0.7H may be built to accomplish a very material flow reduction. Such a modified form of the invention is disclosed in FIG. 21 wherein a deflector 100 is mounted on the roof of a tractor 101 followed by the usual trailer, and wherein the height of the deflector $h'$ is equal to substantially 0.5H where H is the height of the trailer. In this case a box-like structure 102 is provided at the top forward face of the shield 100 containing parallel deflector plates 103 and its face plate 104. By this means a total deflection large enough to produce a flow that will attach to the following body and form a bubble or eddy of the proper dimension may be employed.

In some instances where the roof of the cab of the vehicle is occupied by a box-like structure such as an air conditioner or the like for example, this structure will not in itself provide any separation of flow sufficient to provide material drag reduction. However, under these conditions the provision of a vane 105 forwardly of and extending slightly above the rounded corner of the box 106 as shown in FIG. 22 will cause a widely deflected air stream 107, as illustrated by the arrows, and produce a sufficient deflection to cause the air stream to readhere to the sides of the trailer creating a bubble or eddy in the space between the trailer and the tractor as previously described.

Obviously many other expedients may be employed to achieve the principle of the instant invention, although there are herein disclosed certain preferred embodiments thereof.

From the foregoing it will now be seen that there is herein provided an improved shield or deflector for attachment to the tractor of a tractor-trailer combination, or which may be integrally manufactured therewith, which produces a material reduction in the drag of the combination, and consequent saving in time, expense and driver effort, whereby the effective capacity of the vehicle is no way reduced and which minimizes the effects of yaw or cross wind on the vehicle, which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as as illustrative, and not in a limiting sense.

I claim:

1. In combination with a tractor-trailer vehicle having a gap between the tractor and the trailer, said tractor being of less height than said trailer, an airflow deflecting baffle mounted to extend above the cab roof of said tractor for diverting the air flow relatively widely in a manner to avoid entry of the air stream into said gap thereby creating at least one low pressure air eddy in said gap to reduce the frontal air pressure against the trailer, said diverted air reattaching to the trailer at points spaced rearwardly of said gap, said baffle being inclined vertically rearwardly and forwardly convexed in a horizontal plane, positioned a distance from the front of the trailer equal to approximately 0.7 the half width of the trailer end of a height substantially 0.7 of the difference in height between the tractor cab roof and the roof of the trailer.

2. In combination with a tractor-trailer vehicle having a gap between the tractor and the trailer, an air flow deflecting shield comprising a baffle mounted to extend above the tractor cab roof, said baffle being vertically inclined rearwardly and forwardly convexed in a horizontal plane, said baffle having a predetermined height substantially 0.7 of the difference in height between said cab roof and the trailer roof, said baffle being positioned a distance from the front of the trailer equal to approximately 0.7 the half width of the trailer.

3. In combination with a tractor-trailer vehicle having a gap between the tractor and the trailer, said tractor having a cab with the roof thereof of less height than said trailer, a substantially solid upstanding air flow deflecting baffle mounted to extend above the cab roof and having its lower edge in substantially air impervious relation therewith, for diverting the substantially entire air flow relatively widely in a manner to avoid entry of the air stream into the gap, thereby creating at least one low pressure air eddy in said gap to reduce the frontal air pressure against the trailer, the diverted air reattaching to the trailer at points spaced rearwardly of said gap, said baffle being of a height between 0.5 and 0.9 of the difference in height between the tractor cab roof and the roof of the trailer, and being positioned a distance from the front of the trailer equal to between 0.3 and 2.0 times the half width of the trailer.

4. The structure of claim 3 wherein said baffle is positioned immediately adjacent the rear of the cab roof.

References Cited by the Examiner

UNITED STATES PATENTS

| 2,243,906 | 1/1941 | Huet | 105—2 |
| 2,863,695 | 12/1958 | Stamm | 296—1 |

FOREIGN PATENTS

| 734,735 | 8/1955 | Great Britain. |

A. HARRY LEVY, *Primary Examiner.*

MILTON BUCHLER, *Examiner.*